United States Patent
Agarwal et al.

(10) Patent No.: US 11,520,828 B2
(45) Date of Patent: Dec. 6, 2022

(54) METHODS FOR REPRESENTING AND STORING DATA IN A GRAPH DATA STRUCTURE USING ARTIFICIAL INTELLIGENCE

(71) Applicant: International Business Machines Corporation, Armonk, NY (US)

(72) Inventors: Pulkit Agarwal, Bangalore (IN); Santanu Chakrabarty, Bangalore (IN); Ajitha C, Bangalore (IN); Siddhant Lahoti, Madhya Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 16/938,304

(22) Filed: Jul. 24, 2020

(65) Prior Publication Data
US 2022/0027410 A1 Jan. 27, 2022

(51) Int. Cl.
*G06F 16/00* (2019.01)
*G06F 16/901* (2019.01)
*G06N 5/04* (2006.01)
*G06F 40/284* (2020.01)
*G06Q 10/06* (2012.01)

(52) U.S. Cl.
CPC ........ *G06F 16/9024* (2019.01); *G06F 40/284* (2020.01); *G06N 5/04* (2013.01); *G06Q 10/0633* (2013.01)

(58) Field of Classification Search
CPC ..... G06F 16/9024; G06F 40/284; G06N 5/04; G06Q 10/0633
USPC .......................................................... 707/798
See application file for complete search history.

(56) References Cited

U.S. PATENT DOCUMENTS

| | | | |
|---|---|---|---|
| 10,847,140 B1* | 11/2020 | Conner | G10L 15/1815 707/707 |
| 2014/0188928 A1 | 7/2014 | Singh et al. | |
| 2019/0220472 A1 | 7/2019 | Chen et al. | |

FOREIGN PATENT DOCUMENTS

CN          109597855 A        4/2019

OTHER PUBLICATIONS

Konstantinos Xirogiannopoulos et al., "Extracting and Analyzing Hidden Graphs from Relational Databases," SIGMOD '17, pp. 1-16. (Year: 2017).*

(Continued)

*Primary Examiner* — Alexandria Y Bromell
(74) *Attorney, Agent, or Firm* — Troutman Pepper Hamilton Sanders LLP (57) ABSTRACT

A computer-implemented method for representing and storing data in an extendable graph data structure using artificial intelligence includes obtaining business requirements data, business workflow data, and dictionary data. A relationship between one or more entities in the obtained business requirement data and the business workflow data is identified using the obtained dictionary data and applying a natural language processing technique and topic based trend identification from existing entities and associated attributes. An extendable graph data structure represented by an enriched adjacency matrix for the identified relationship between the one or more entities is generated and stored. One or more trends are identified using the stored graph data structure.

20 Claims, 11 Drawing Sheets

(56) References Cited

OTHER PUBLICATIONS

Konstantinos et al. Extracting and Analyzing Hidden Graphs from Relational Databases. SIGMOD '17 Proceedings of the 2017 ACM International Conference on Management of Data, pp. 897-912.

* cited by examiner

Business Requirement Document

This is a site that aims at implementing the Justice System. The following are the business targets that are to be achieved via this:

1. Filing the Criminal Report

The system must cater to both the existing and new complaints. For new complaints it should provide a way to file a complaint. The existing complaint should be shown with the complete information. The complaint for should contain the proper description of crime, suspects, demographics details of the person filing complaint.

2. Incidence of Juvenile Crime

The presence of several risk factors often increases a youth's chance of offending, impulsive behavior, uncontrolled....

FIG. 4

| Document 1 | Crime/Criminal | Complaint |
|---|---|---|
| | 6 | 10 |

FIG. 5A

| Root | Dependency 1 | Dependency 2 | ... Dependency n |
|---|---|---|---|
| Person | Complaints | | Dependency n |
| Complaints | Criminal | Financial | Dependency n |
| Education | DropOutReason | DropOutReason1 | Dependency n |
| ... ... | | | |

Obtained additional data
705

"The compliant should contain proper description of crime, suspects, and weapons" says O'Neill.

| The | compliant | should | contain | proper |
| description | of | crime | suspects | weapons |
| says | O | Neill | | |

Plurality of Tokens 710

Adjacency list

| | |
|---|---|
| A | Person : John |
| B | Person : James |
| C | Person : Sally |
| D | Location |
| E | Crime details 100 |
| F | Crime details 101 |
| G | Crime details 103 |
| H | Investigation details |
| I | Judgement details |

Adjacency Matrix

| | A | B | C | D | E | F | G | H | I |
|---|---|---|---|---|---|---|---|---|---|
| A | 0 | 1 | 1 | 0 | 0 | 0 | 0 | 0 | 0 |
| B | 1 | 0 | 0 | 0 | 1 | 0 | 0 | 0 | 0 |
| C | 1 | 0 | 0 | 0 | 0 | 1 | 0 | 0 | 0 |
| D | 0 | 0 | 0 | 0 | 1 | 1 | 1 | 0 | 0 |
| E | 0 | 1 | 0 | 1 | 0 | 0 | 0 | 0 | 0 |
| F | 0 | 0 | 1 | 1 | 0 | 0 | 0 | 0 | 0 |
| G | 0 | 0 | 0 | 1 | 0 | 0 | 0 | 1 | 1 |
| H | 0 | 0 | 0 | 0 | 0 | 0 | 1 | 0 | 0 |
| I | 0 | 0 | 0 | 0 | 0 | 0 | 1 | 0 | 0 |

METHODS FOR REPRESENTING AND STORING DATA IN A GRAPH DATA STRUCTURE USING ARTIFICIAL INTELLIGENCE

TECHNICAL FIELD

The present application generally relates to database management systems, and more particularly, to efficiently represent and store data in a graph data structure using artificial intelligence and devices thereof.

BACKGROUND

A database management system (DBMS) is computer software that stores data and provides software routines for manipulating the stored data. A DBMS may be used directly (i.e., by human users), as a component of another software package, or to provide service to another software package. A database is a collection of data which is stored and managed as a unit by a DBMS. A relational database is a database which contains tables that are used to store sets of data and to specify relationships between the different sets of data stored in the database. In a traditional relational database management system (RDBMS), the data elements are organized in terms of rows and columns. This model works best when managing data from limited number of tables. However, to identify the relationship between the different entities within the relational database and to obtain insights, complex join and union operations are required to be performed. One of the technological problems associated with performing complex joins and unions is that the operations consume numerous processing cycles thereby drastically reducing the performance of the computing system.

SUMMARY

Embodiments provide a computer-implemented method for representing and storing data in a graph data structure using artificial intelligence includes obtaining business requirements data, business workflow data, and dictionary data. A relationship between one or more entities in the obtained business requirement data and the business workflow data is identified using the obtained dictionary data and applying a natural language processing technique. A graph data structure for the identified relationship between the one or more entities is generated. One or more trends are identified using the generated graph data structure. These one or more trends on the similar data attributes or collection of attributes are identified to refine the adjacency matrix. The refinement of adjacency matrix refers to the allocation of nodes closer to each other based on the relevancy defined by a trend or a group of trends. By using this technique, the graph becomes more efficient as traversal from one data point to other becomes less time consuming hence improving the time complexity for the data retrieval.

In one of the embodiments, classifier data from the obtained business requirements data and the business workflow data is generated by tokenizing and reducing inflectional forms of each word within the obtained business requirements data and the business workflow data.

In another embodiment, the graph data structure is generated from an adjacency matrix that is generated from the identified relationship between the one or more entities and also factoring in the trend pattern for the identified topics and variables.

In yet another embodiment, the obtained business requirements data and the business workflow data are represented in a relational database prior to generating the graph data structure.

In another embodiment, the graph data structure is generated from the relational database.

In another embodiment, the one or more trends are identified from the generated graph data structure without performing one or more join operations or one or more union operations.

In another illustrative embodiment, a non-transitory computer readable medium comprising a computer usable or readable medium having a computer readable program is provided. The computer readable program, when executed on a processor, causes the processor to perform various ones of, and combinations of, the operations outlined above with regard to the method illustrative embodiment.

In yet another illustrative embodiment, a system is provided. The system may comprise a full question generation processor configured to perform various ones of, and combinations of, the operations outlined above with regard to the method illustrative embodiment.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

The present invention may be a system, a method, and/or a computer program product for efficiently representing and storing data in a graph data structure using artificial intelligence. The computer program product may include a computer-readable storage medium (or media) having computer-readable program instructions thereon for causing a processor to carry out aspects of the present invention.

Figure 1:
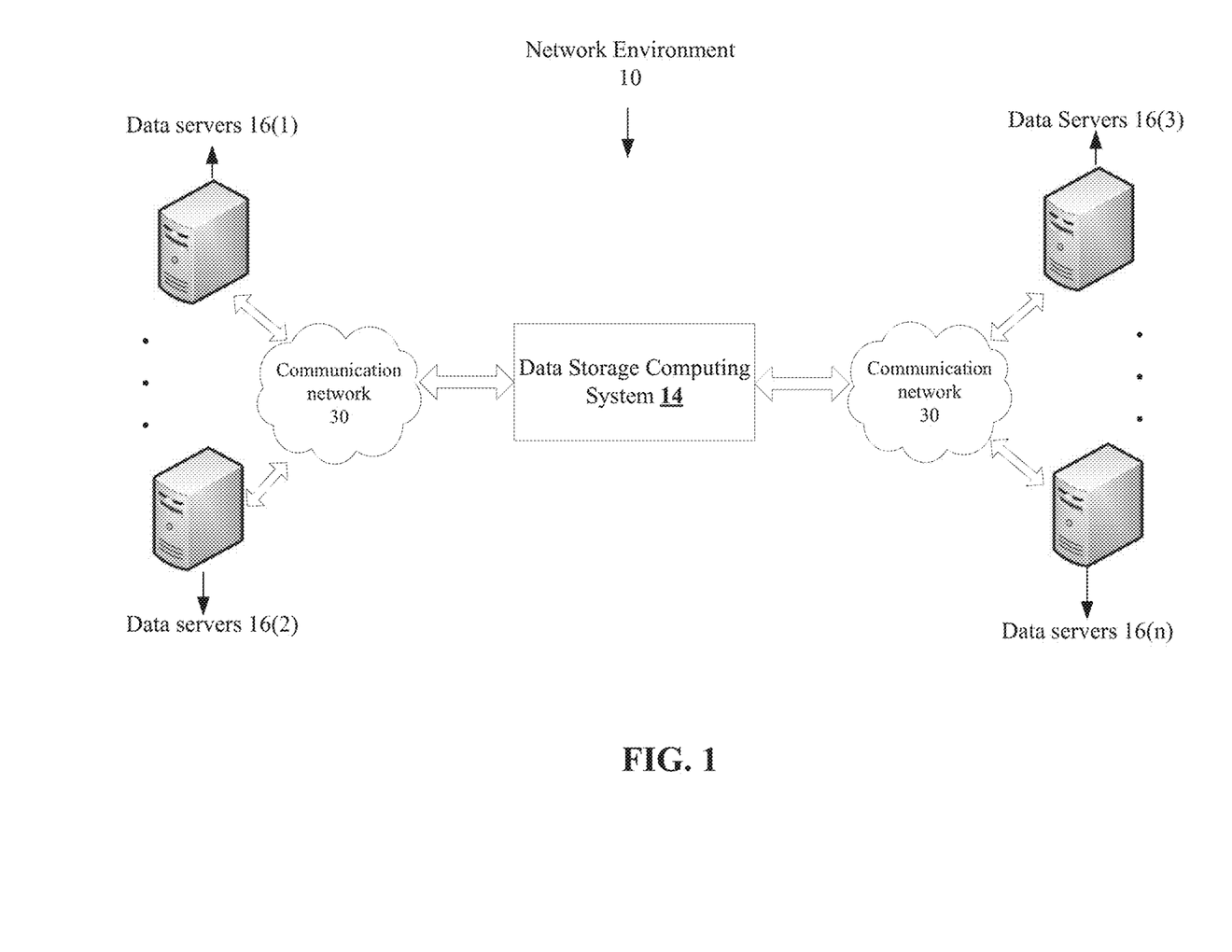
FIG. 1 is an example of a block diagram of a network environment 10 including a data storage computing system 14 for efficiently storing data using artificial intelligence.
Figure 2:
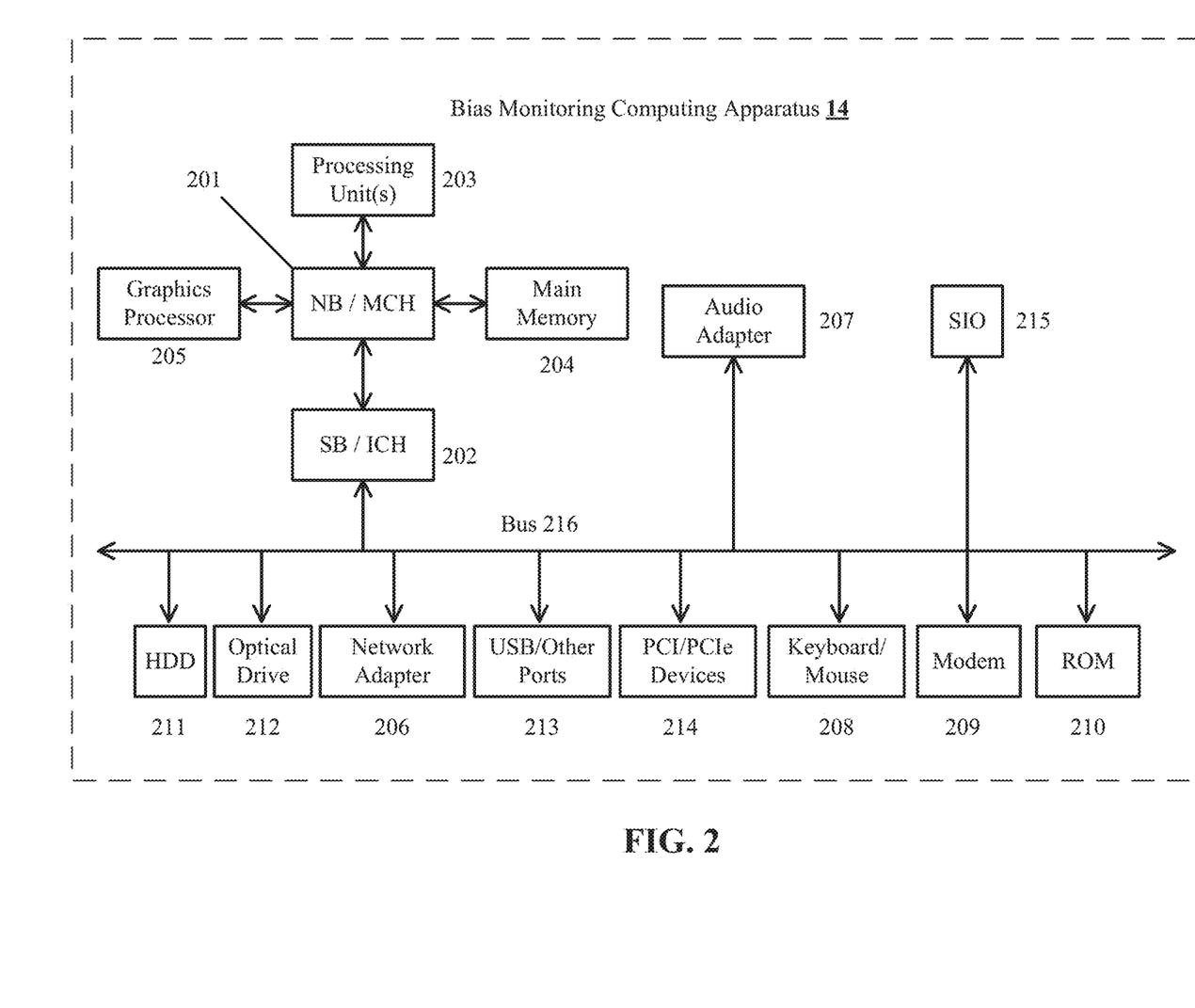
FIG. 2 is an example of a block diagram of a data storage computing system 14.
Figure 3:
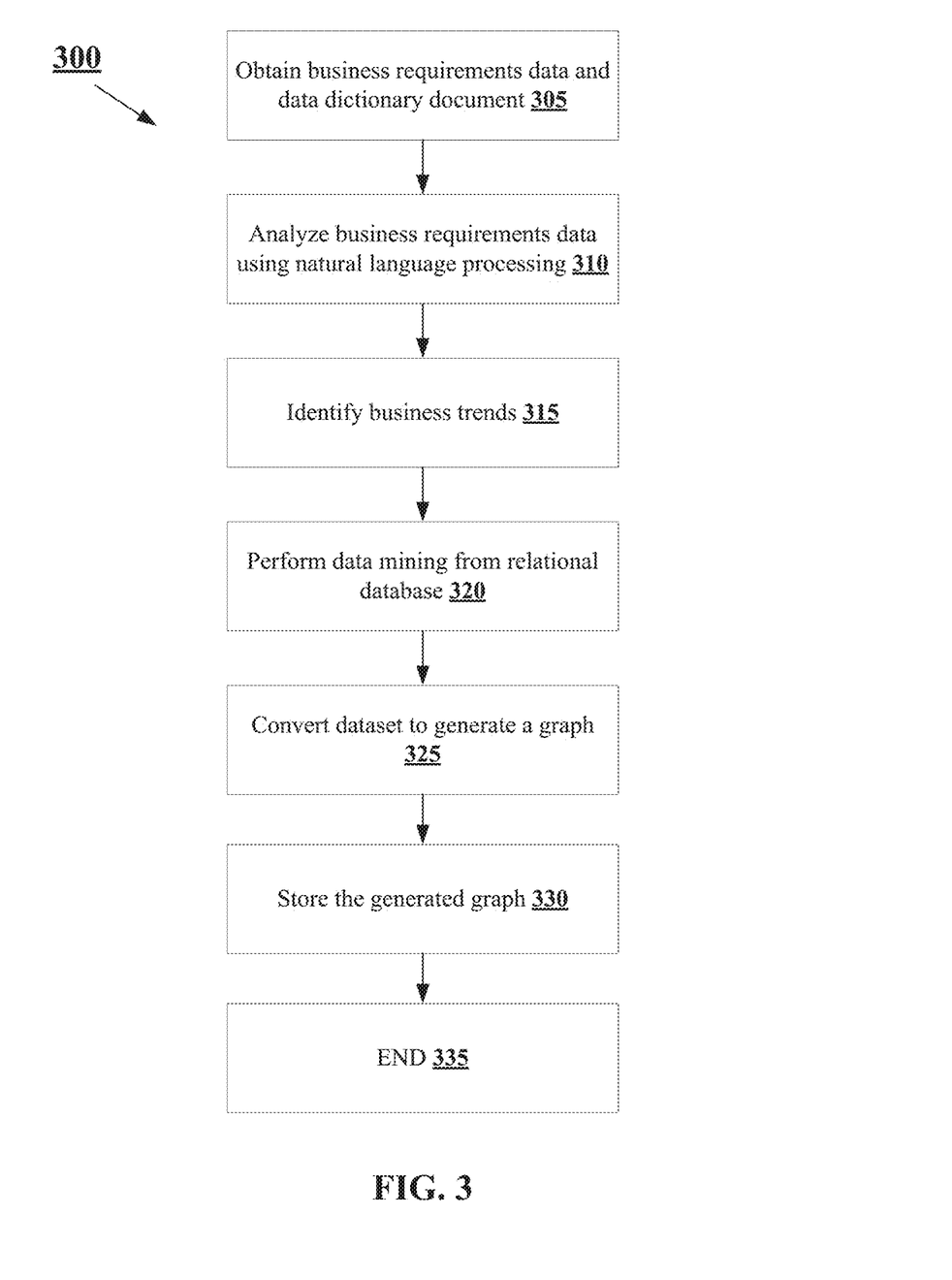
FIG. 3 is an exemplary flowchart illustrating a method 300 for represent and store data in a graph data structure using artificial intelligence.

A network environment 10 with an example of a data storage computing system 14 is illustrated in FIGS. 1-2. In this particular example, the environment 10 includes the data storage computing system 14 and one or more data servers 16(1)-16(n), coupled via one or more communication networks 30, although the environment could include other types and numbers of systems, devices, components, and/or other elements as is generally known in the art and will not be illustrated or described herein. This technology provides a number of advantages including providing methods, non-transitory computer readable medium, and systems that efficiently stores data using artificial intelligence (AI).

Referring more specifically to FIGS. 1-2, the data storage computing system 14 is programmed to efficiently stores data using AI. Now referring to FIG. 2, the data storage computing system 14 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read-only memory (ROM) 210, hard disk drive (HDD) 211, optical drive (CD or DVD) 212, universal serial bus (USB) ports and other communication ports 213, and the PCI/PCIe devices 214 can connect to the SB/ICH 702 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH.

An operating system can run on processing unit 203. The operating system can coordinate and provide control of various components within the data storage computing system 14. As a client, the operating system can be a commercially available operating system. An object-oriented programming system, such as the Java™ programming system, may run in conjunction with the operating system and provide calls to the operating system from the object-oriented programs or applications executing on the data processing system 700. As a server, the data storage computing system 14 can be an IBM® eServer™ System p® running the Advanced Interactive Executive operating system or the Linux operating system. The data storage computing system 14 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the full question generation system can be performed by the processing unit 703 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the data storage computing system 14 includes several components that would not be directly included in some embodiments illustrated in FIGS. 3-10B. However, it should be understood that the embodiments illustrated in FIGS. 3-10B may include one or more of the components and configurations of the data storage computing system 14 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data storage computing system 14 can take the form of any of a number of different data processing systems, including but not limited to, client computing devices, server computing devices, tablet computers, laptop computers, telephone or other communication devices, personal digital assistants, and the like. Essentially, data processing system 700 can be any known or later developed data processing system without architectural limitation.

Referring back to FIG. 1, each of the one or more data servers 16(1)-16(n) may store and provide data to the data storage computing system 14 via one or more of the communication networks 30, for example, although other types and/or numbers of storage media in other configurations could be used. In this particular example, each of the one or more data servers 16(1)-16(n) may comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the plurality of data servers 16(1)-16(n) and may transmit data in response to requests from the data storage computing system 14. Each the one or more data servers 16(1)-16(n) may include a processor, a memory, and a communication interface, which are coupled together by a bus or other link, although each may have other types and/or numbers of other systems, devices, components, and/or other elements.

The non-transitory computer readable storage medium can be a tangible device that can retain and store instructions for use by an instruction execution device. The non-transitory computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A non-transitory computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The non-transitory computer readable program instructions described herein can be downloaded to respective computing/processing devices from a computer readable storage medium or to an external computer or external storage device via a communication network 30, for example, the Internet, a local area network (LAN), a wide area network (WAN) and/or a wireless network. The communication network 30 may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of communication network 30, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present description and claims may make use of the terms "a," "at least one of," and "one or more of," with regard to particular features and elements of the illustrative embodiments. It should be appreciated that these terms and phrases are intended to state that there is at least one of the particular features or elements present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112 (f), unless the element is expressly recited using the phrase "means for."

An exemplary method for representing and storing data in a graph data structure using artificial intelligence will now be illustrated with reference to FIGS. 3-10B. The exemplary method 300 begins at step 305 where the data storage computing system 14 obtains business requirements data and/or the data dictionary document from one of the one or more data servers 16(1)-16(n). In this example, the business requirements data includes an end user requirement about specific insights, business flow associated with one or more applications executing, and system implementation details about pertinent business flows. Further, the end user requirement describes required topics indicating the business need for insight generation and these will aid in defining the graph structure for deciding the grouping of relevant data items and how the groups will be arranged in the graph along with the degree of relevance which in turn will indicate the closeness for nodes in the graph and weight for the connected edges. Additionally in this example, the business flow associated with one or more applications executing includes data associated with deciding the data items that are present in the existing system and what stage in the processing they are present and how they influence the processing flow. Furthermore, the data dictionary document describes the structural details and dependencies of the database entities.

Figure 4:
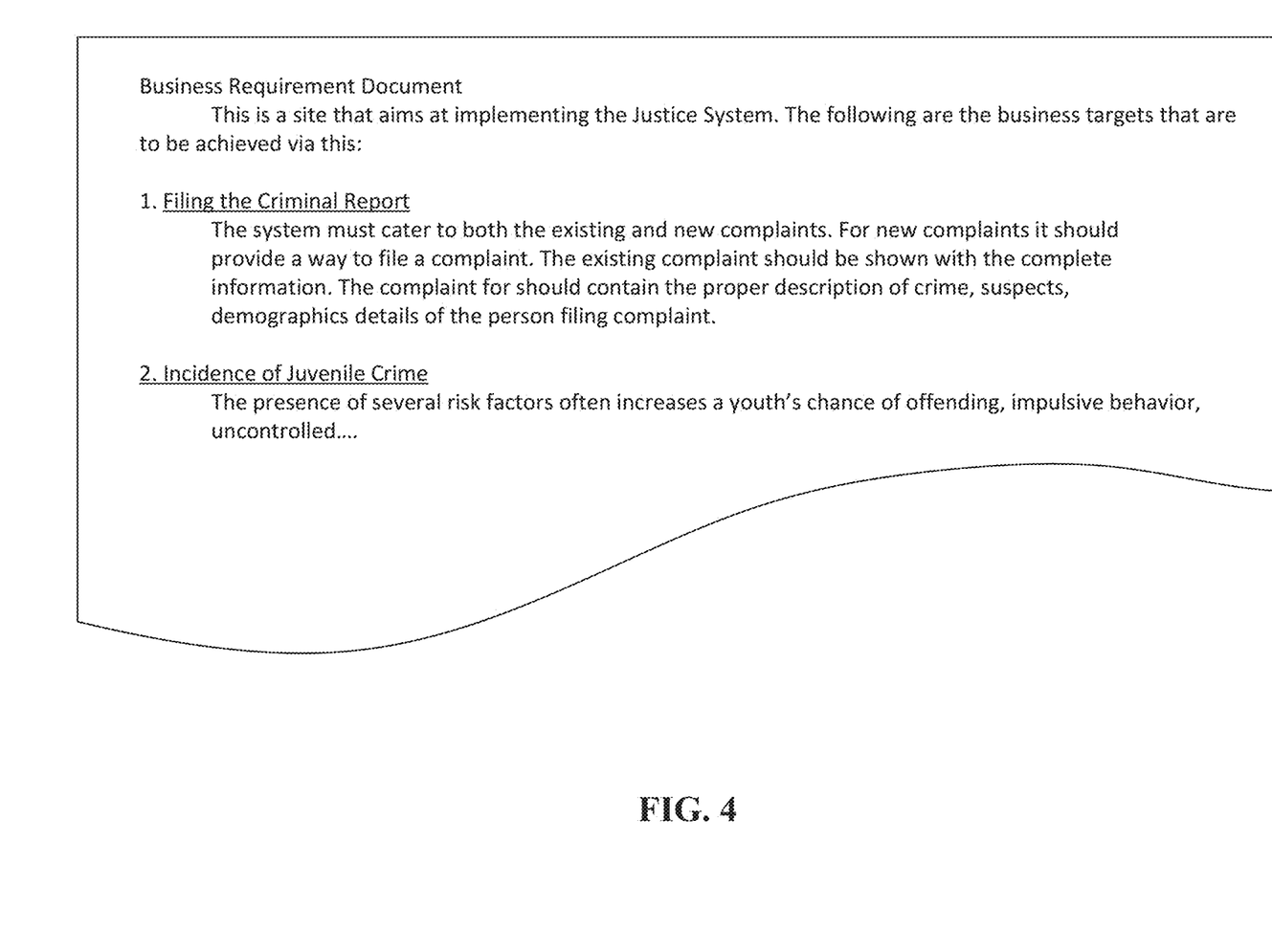
FIG. 4 is an exemplary image of business requirement data.

An example of the business requirements data is illustrated in FIG. 4. For purpose of further illustration, the business requirements data illustrated in FIG. 4 includes textual data associated with implementing an automated juvenile justice system and the description of the business targets that is required to be achieved by the automated juvenile justice system, although the business requirements data can also include other formats of data such as images or videos.

Referring back to FIG. 3, next in step 310, the data storage computing system 14 analyzes the business requirements data and the data dictionary document using natural language processing. During the step of analyzing the business requirements data and the data dictionary document, the data storage computing system 14 first uses term frequency-inverse document frequency (TF-IDF) technique to reflect importance of every word within the document. In this example, the TF-IDF technique assists with identifying important words and deleting the unimportant words from the business requirements data. Next, with the important words, the data storage computing system 14 uses a latent dirichlet allocation (LDA) technique to identify the topics included within the business requirements. The identified topics are further clustered using the TF-IDF technique to identify the important requirements from the obtained business requirements data. Additionally, the data storage computing system 14 uses the data in the data dictionary to identify the different relationship between the entities and the topics present in the business requirements data.

Figure 5A:
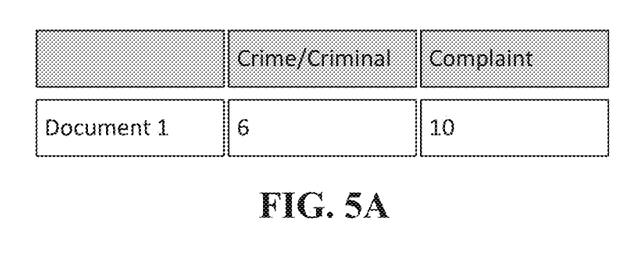
FIGS. 5A-5B are exemplary images illustrating tables including the important topics and requirements identified and the relationship between the entities and topics from the business requirement data.
Figure 5B:
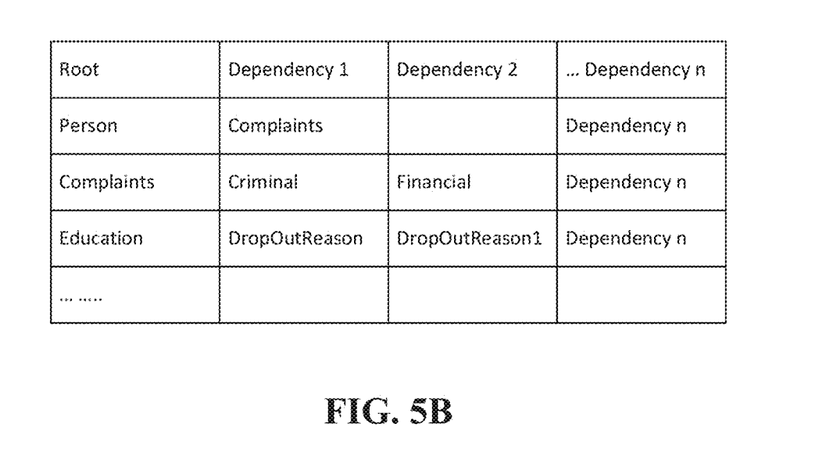

By way of example, FIG. 5A-5B illustrates an exemplary tables including the important topics and requirements identified and the relationship between the entities and topics from the business requirement data using the technique illustrated above in step 310. As illustrated in FIG. 5A, the topic criminal or crime in the business requirement data has around six occurrences and the topic compliant is identified at ten different locations within the business requirement data and therefore the data storage computing system 14 identifies crime or criminal or compliant as the important topics and requirements. Referring to FIG. 5B, the exemplary table illustrates the relationship between the entities and the topics. By way of example, the terms complaints has a relationship to a person and compliant also has a dependency relationship to criminal and financial. Further, the topic education has two dependencies drop out reason and drop out reason 1. Similarly, the data storage computing system 14 uses the dictionary data to identify the relationship between the topics and the entities in the business requirements data.

Referring back to FIG. 3, next in step 315, the data storage computing system 14 identifies the business trends which will now be further illustrated with reference to the exemplary flowchart 600 illustrated in FIG. 6. In step 605 of the exemplary flowchart 600 illustrated in FIG. 6, the data storage computing system 14 obtains additional data associated with the identified relationships between the topics and the entities. By way of example, the data storage computing system 14 obtains the additional data from websites hosted by the one or more data servers 16(1)-16(n) using the uniform resource locators (URLs). In this example, the additional data obtained by data storage computing system 14 is unstructured data, although in other examples, the additional data can also include structured data.

In step 610, the data storage computing system 14 tokenizes the obtained additional data. In this example, tokenizing relates to dividing the obtained data into a plurality of fragments called tokens and deleting certain characters such as punctuation. An example of the step 610 will now be further illustrated with reference to FIG. 7. By way of example, if the obtained additional data 705 includes a sentence "the compliant should contain proper description of crime, suspects, and weapons, says O'Neill", the data storage computing system 14 divides the obtained additional data 705 into a plurality of tokens 710 by separating the words and removing the punctuations.

Figure 6:
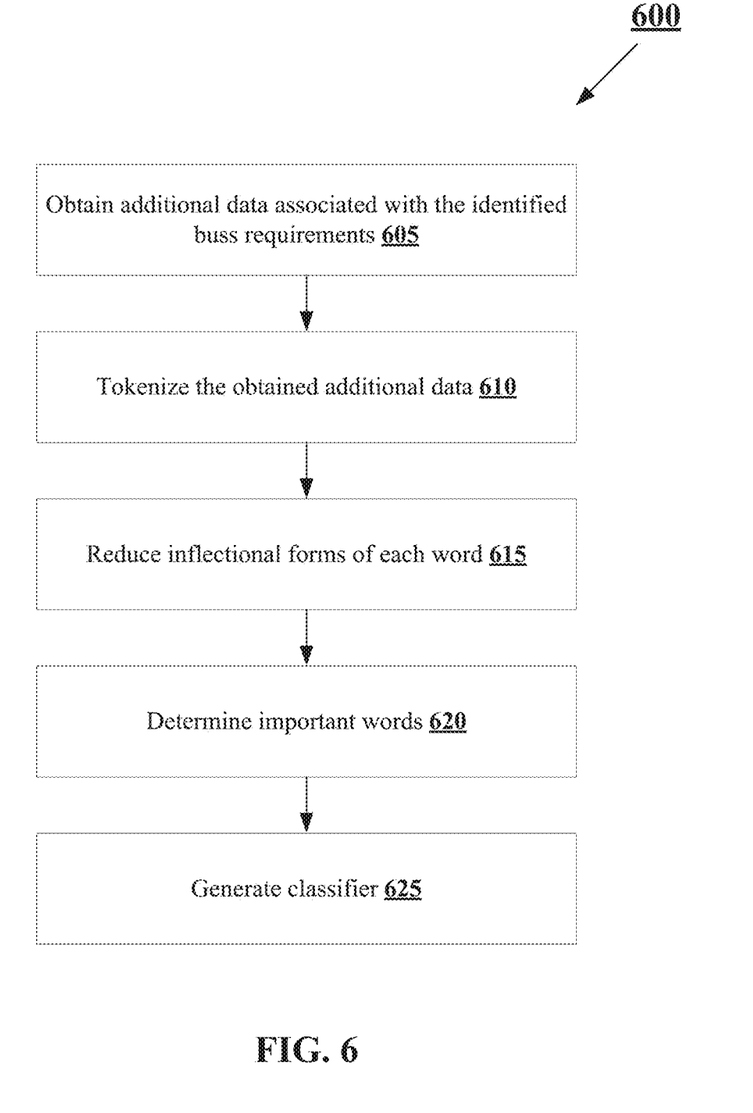
FIG. 6 is an exemplary flowchart illustrating a method 600 for identifying business trends.
Figure 7:
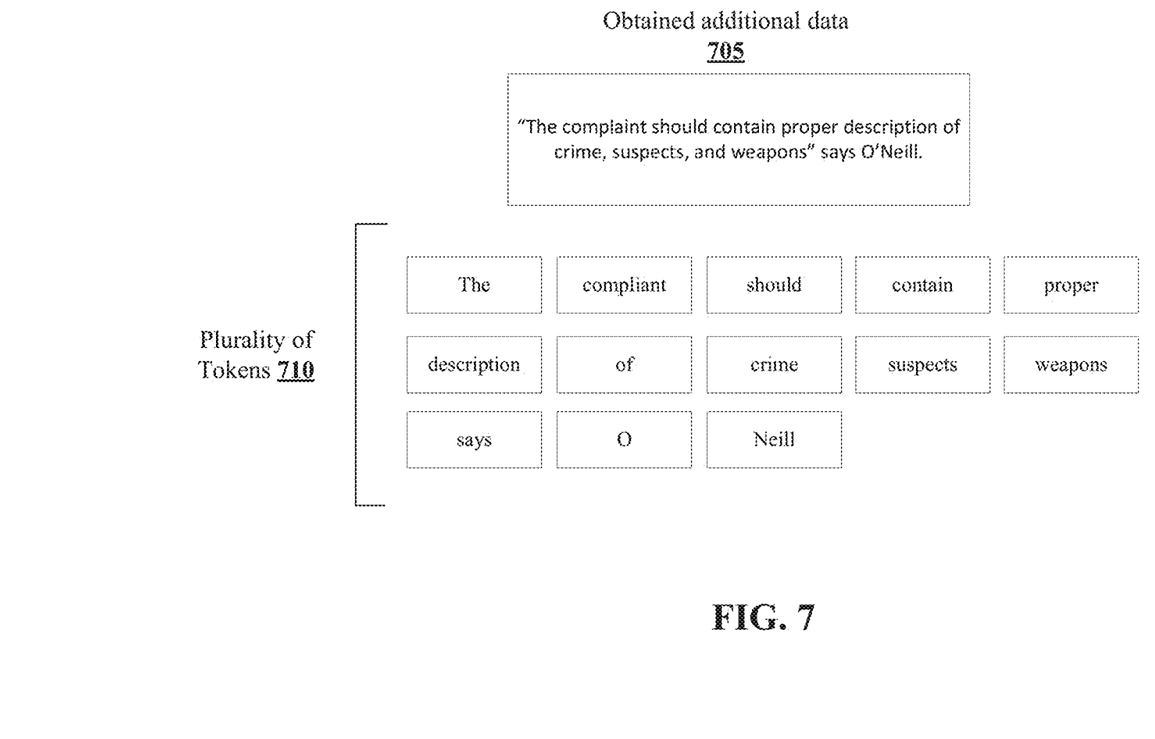
FIG. 7 is an exemplary block diagram illustrating tokenizing obtained data.

Referring back to the exemplary flowchart 600 of FIG. 6, in step 615, the data storage computing system 14 reduces the inflectional forms of each word. In this example, inflectional relates to or involves a change in the form of a word to express a grammatical function or attribute. By way of example, the data storage computing system 14 uses the Stemming and Lemmatization techniques that is recognizable by a person having ordinary skill in the art to reduce the inflectional forms of each word.

Next in step 620, the data storage computing system 14 determines the important words using the term frequency-inverse document frequency (TF-IDF) technique. In the term frequency-inverse document frequency, the data storage computing system 14 first measures the frequency of the word. Next, the data storage computing system 14 uses semantic processing to index related words. Further, the data storage computing system 14 performs semantics collation which includes assigning weights to each of the index. Next, the data storage computing system 14 scores sentiment for a collection of words based on the semantic score to determine the significance of words for the topic. Furthermore, the data storage computing system 14 groups the topics based on the relevance defined by the scores and finally the important words are identified by associating words against each of the identified topic.

In step 625, the data storage computing system 14 generates a classifier to form the business context from the determined important words to identify the trends for the identified topics. In this example, the business context relates to a collection of classes or matrix of topic terms with related database tables/entities with a numerical score to show the dependency of a topic with the existing data and process model. In this example, the data storage computing system 14 uses the obtained business requirement data, the business flow data, the data dictionary, the important words and the associated scores to generates the classifier and thereby identify the trends.

Figure 8:
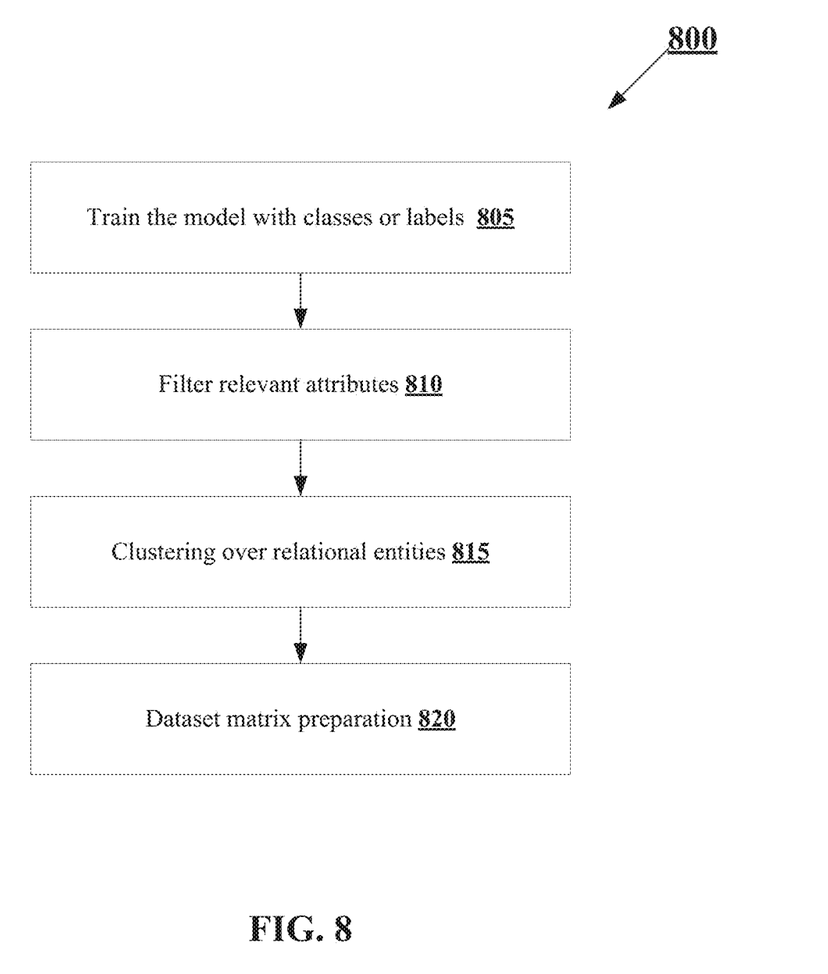
FIG. 8 is an exemplary flowchart illustrating a method 800 for performing data mining operation.

Referring back to FIG. 3, in step 320, the data storage computing system 14 performs data mining operation on the relational database which will now be illustrated with reference to the exemplary flowchart 800 illustrated in FIG. 8. In step 805, the data storage computing apparatus 14 trains the AI models with classes or labels name so that the AI model can improve the accuracy with the dataset prediction.

In step 810, the data storage computing apparatus 14 automatically filters the relevant attributes from the given relational data by using keywords, tokens and entity relationships and classifies relational entities. In this example, classification mines the attribute information and map entities to the labeled dataset which basically contains the observations about the categories defined by the discrete training data provided in the above illustrated training step 805. By way of example, person, address, email entities are grouped into demographics dataset; property crimes, violent crimes, drug crimes are grouped into crime details dataset; and educational details, employment details are grouped into qualification details dataset.

In step 815, the data storage computing system 14 performs clustering over relational entities. In this example, clustering process is also used to group the attributes like the classification process illustrated above in step 810. Unlike classification, clustering process categorize the attributes into groups that were not previously defined. The entities which are not segmented by any predefined target under classification process are handled through clustering models to find natural groupings. By way of example, case details, arrest rates, judgement details are grouped into justice dataset; and complaints filled, complaints dismissed are grouped into complaints details dataset.

Figure 9A:
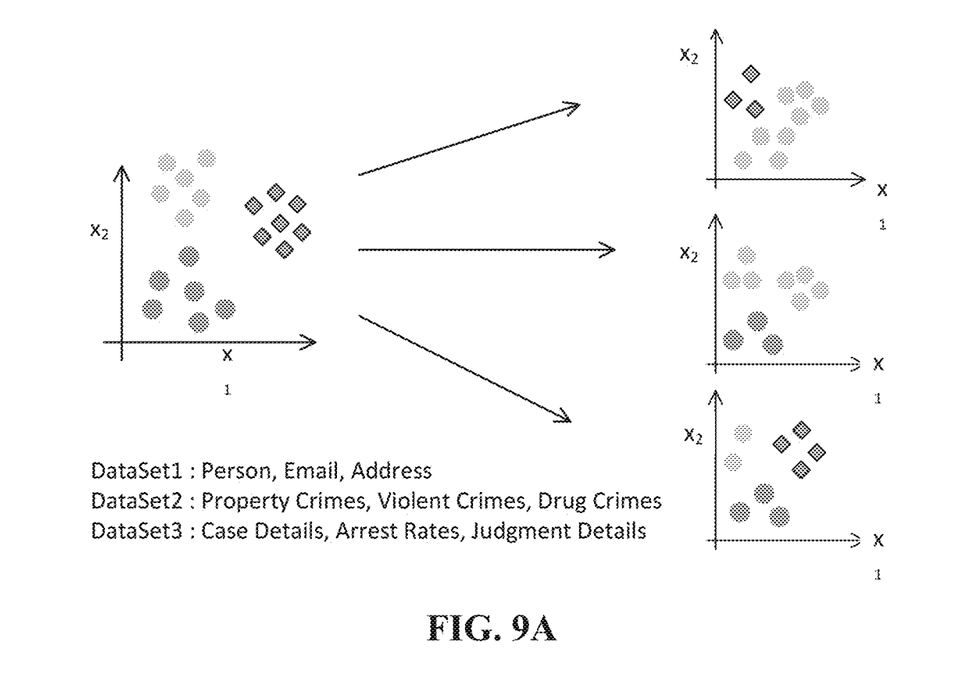
FIGS. 9A-9B are exemplary images illustrating generating datasets.
Figure 9B:
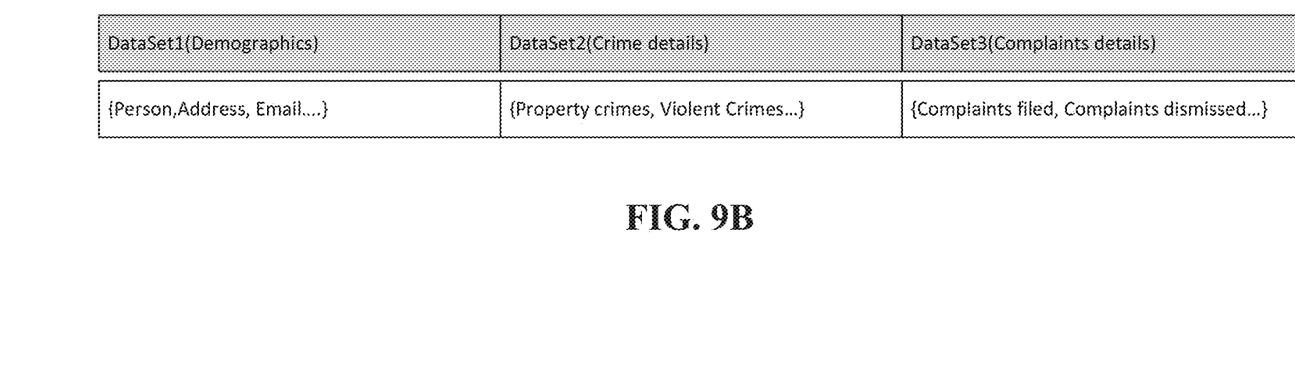

In step 820, the data storage computing system 14 generates a dataset matrix for further processing. In this example, each cell in the dataset matrix contains the filtered attributes from the entities with the attribute relationships. An illustrative example of generating the dataset matrix is described in FIGS. 9A-9B which will now be further described. As illustrated in FIG. 9A, the data storage computing system 14 creates three different dataset including a first dataset that relates to person, email, address, a second dataset relating to property crimes, violent crimes, and drug crimes; and another dataset relating to the case details, arrest rates, and judgment details. FIG. 9B is a matrix representation of the three datasets illustrated in FIG. 9A.

Additionally in this example, the datasets illustrated in FIG. 9B are at the intermediate level, this is, the grouping of data items depending on the data observations which are available in the data base. As part of next level of processing, the data storage computing system 14 uses the above illustrated datasets and along with the token details obtained from the insight generation guidance matrix to identify the relevant data items and their significance with the requested business insight from the business requirement data. Additionally, in this example, the data storage computing system 14 uses the business requirement data and the token level details to generate the tokens associated with the business flow data.

Figure 10A:
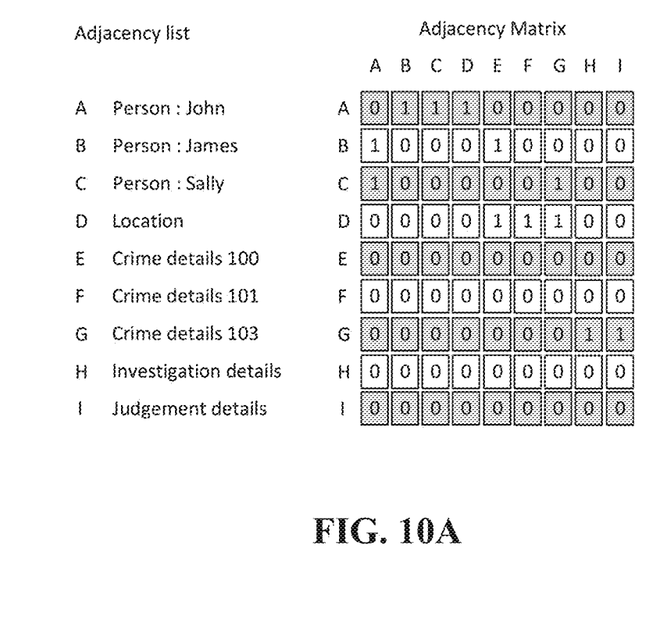
FIGS. 10A-10B are exemplary images illustrating an adjacency matrix and a graph generated using the adjacency matrix.
Figure 10B:
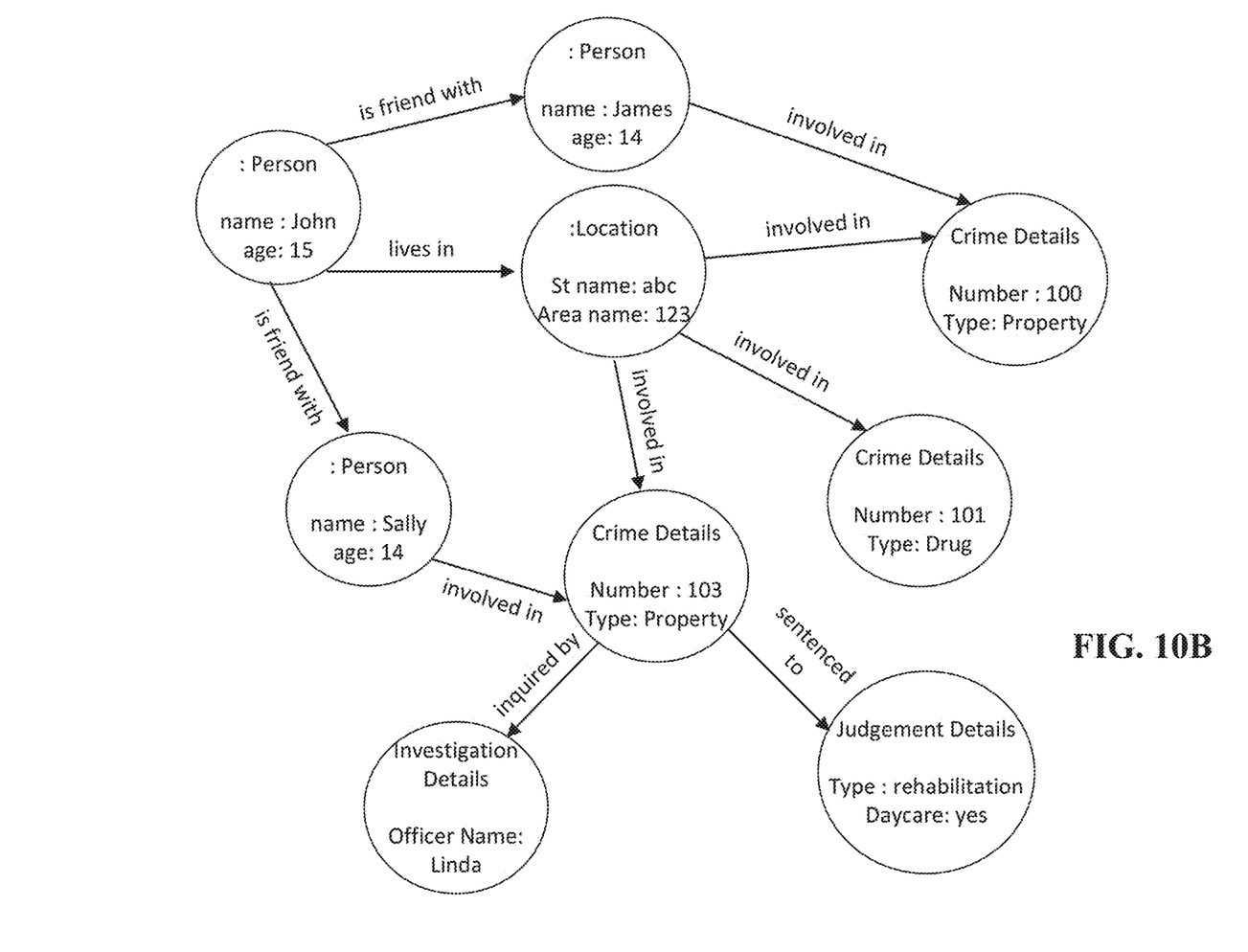

Referring back to FIG. 3, in step 325, the data storage computing system 14 converts the dataset into a graph data structure. In this example, the data storage computing system 14 first generates an adjacency matrix from the datasets where the adjacency matrix is the representation of the graph in a matrix format. In this example, the adjacency matrix is generated by applying one or more AI models on the datasets in the relational database management systems. An example of the matrix format is illustrated in FIG. 10A. Next, the data storage computing system 14 using the adjacency matrix generated a graph with edges, vertices and their interconnections and an exemplary graph is illustrated in FIG. 10B.

Referring back to FIG. 3, in step 330, the data storage computing system 14 stores the generated graph within the memory in form of a graph data structure. By converting textual data received in a business requirement data illustrated by way of example in FIG. 4 to a graph illustrated in FIG. 10B, by way of example, the disclosed technology is able to store data using substantially less memory space. Additionally, representing the data in form of a graph data structure provides better insights regarding the data without requiring complex joins and unions operations thereby improving the performance of the data storage computing system 14.

An example of the disclosed technology will now be illustrated. First, the business requirements for implementing an automated juvenile justice system and the description of the business targets that is required to be achieved by the automated juvenile justice system is received. Next, the business requirements data and the data dictionary document is analyzed using natural language processing to identify important topics such as crime, criminal or complaint. Further, the relationship between the identified topics and the entities is identified, i.e, the person who has committed the crime and the description of the crime committed. Next, data mining is performed to identify the demographic information associated with the entities, i.e, name of the person, physical address etc. Finally, the identified relationship and the mined data is represented as a graph data structure.

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:
1. A method comprising:
  obtaining, by a data storage computing system, business requirements data, business workflow data, and dictionary data;

identifying, by the data storage computing system, a relationship between one or more entities in the obtained business requirement data and the business workflow data using the obtained dictionary data and applying a natural language processing technique;

generating, by the data storage computing system, a graph data structure for the identified relationship between the one or more entities;

storing, by the data storage computing system, the generated graph data structure; and identifying, by the data storage computing system, one or more trends using the stored graph data structure.

2. The method as set forth in claim 1 further comprising: generating, by the data storage computing system, classifier data from the obtained business requirements data and the business workflow data by tokenizing and reducing inflectional forms of each word within the obtained business requirements data and the business workflow data.

3. The method as set forth in claim 1 wherein the graph data structure is generated from an adjacency matrix, wherein the adjacency matrix comprises a recommendation dataset for generating the graph data structure, and wherein the generated adjacency matrix is refined based on one or more trend patterns associated with identified one or more topics.

4. The method as set forth in claim 1 further comprising: representing, by the data storage computing system, the obtained business requirements data and the business workflow data in a relational database prior to generating the graph data structure.

5. The method as set forth in claim 4 further comprising, generating, by the data storage computing system, the adjacency matrix from the relational database, wherein the generating further comprising, generating the graph data structure using the generated adjacency matrix, and wherein the adjacency matrix is generated by applying one or more artificial intelligence models on the relational database.

6. The method as set forth in claim 1 wherein the one or more trends are identified from the generated graph data structure without performing one or more join operations or one or more union operations.

7. A non-transitory machine readable medium having stored thereon instructions comprising machine executable code which when executed by at least one machine causes the machine to:

obtain business requirements data, business workflow data, and dictionary data;

identify a relationship between one or more entities in the obtained business requirement data and the business workflow data using the obtained dictionary data and applying a natural language processing technique;

generate a graph data structure for the identified relationship between the one or more entities;

store the generated graph data structure; and identify one or more trends using the stored graph data structure.

8. The medium as set forth in claim 7, further comprising, generating classifier data from the obtained business requirements data and the business workflow data by tokenizing and reducing inflectional forms of each word within the obtained business requirements data and the business workflow data.

9. The medium as set forth in claim 7 wherein the graph data structure is generated from an adjacency matrix, wherein the adjacency matrix comprises a recommendation dataset for generating the graph data structure, and wherein the generated adjacency matrix is refined based on one or more trend patterns associated with identified one or more topics.

10. The medium as set forth in claim 7 further comprising: representing the obtained business requirements data and the business workflow data in a relational database prior to generating the graph data structure.

11. The medium as set forth in claim 10 further comprising, generating the adjacency matrix from the relational database, wherein the generating further comprising, generating the graph data structure using the generated adjacency matrix, and wherein the adjacency matrix is generated by applying one or more artificial intelligence models on the relational database.

12. The medium as set forth in claim 7 wherein the one or more trends are identified from the generated graph data structure without performing one or more join operations or one or more union operations.

13. A data storage computing system, comprising a memory comprising programmed instructions stored in the memory and one or more processors configured to be capable of executing the programmed instructions stored in the memory to:

obtain business requirements data, business workflow data, and dictionary data;

identify a relationship between one or more entities in the obtained business requirement data and the business workflow data using the obtained dictionary data and applying a natural language processing technique;

generate a graph data structure for the identified relationship between the one or more entities;

store the generated graph data structure; and identify one or more trends using the stored graph data structure.

14. The apparatus system as set forth in claim 13 wherein the one or more processors are further configured to be capable of executing the programmed instructions stored in the memory to generate classifier data from the obtained business requirements data and the business workflow data by tokenizing and reducing inflectional forms of each word within the obtained business requirements data and the business workflow data.

15. The system as set forth in claim 13 wherein the graph data structure is generated from an adjacency matrix, wherein the adjacency matrix comprises a recommendation dataset for generating the graph data structure, and wherein the generated adjacency matrix is refined based on one or more trend patterns associated with identified one or more topics.

16. The system as set forth in claim 13 wherein the one or more processors are further configured to be capable of executing the programmed instructions stored in the memory to represent the obtained business requirements data and the business workflow data in a relational database prior to generating the graph data structure.

17. The system as set forth in claim 16 wherein the one or more processors are further configured to be capable of executing the programmed instructions stored in the memory to generate the adjacency matrix from the relational database, wherein the generating further comprising, generating the graph data structure using the generated adjacency matrix, and wherein the adjacency matrix is generated by applying one or more artificial intelligence models on the relational database.

18. The system as set forth in claim 13 wherein the one or more trends are identified from the generated graph data structure without performing one or more join operations or one or more union operations.

19. The system as set forth in claim 13 wherein obtained business requirements data, business workflow data, and dictionary data are tokenized into a plurality of fragments.

20. The system as set forth in claim 13 wherein the stored graph data structure consumes less memory space than the obtained business requirements data, business workflow data, and dictionary data.

\* \* \* \* \*